Sept. 1, 1964     N. A. DE BRUYNE     3,147,365
THERMOSTATICALLY CONTROLLED IMMERSION HEATER ASSEMBLY
Filed March 26, 1963     3 Sheets—Sheet 1
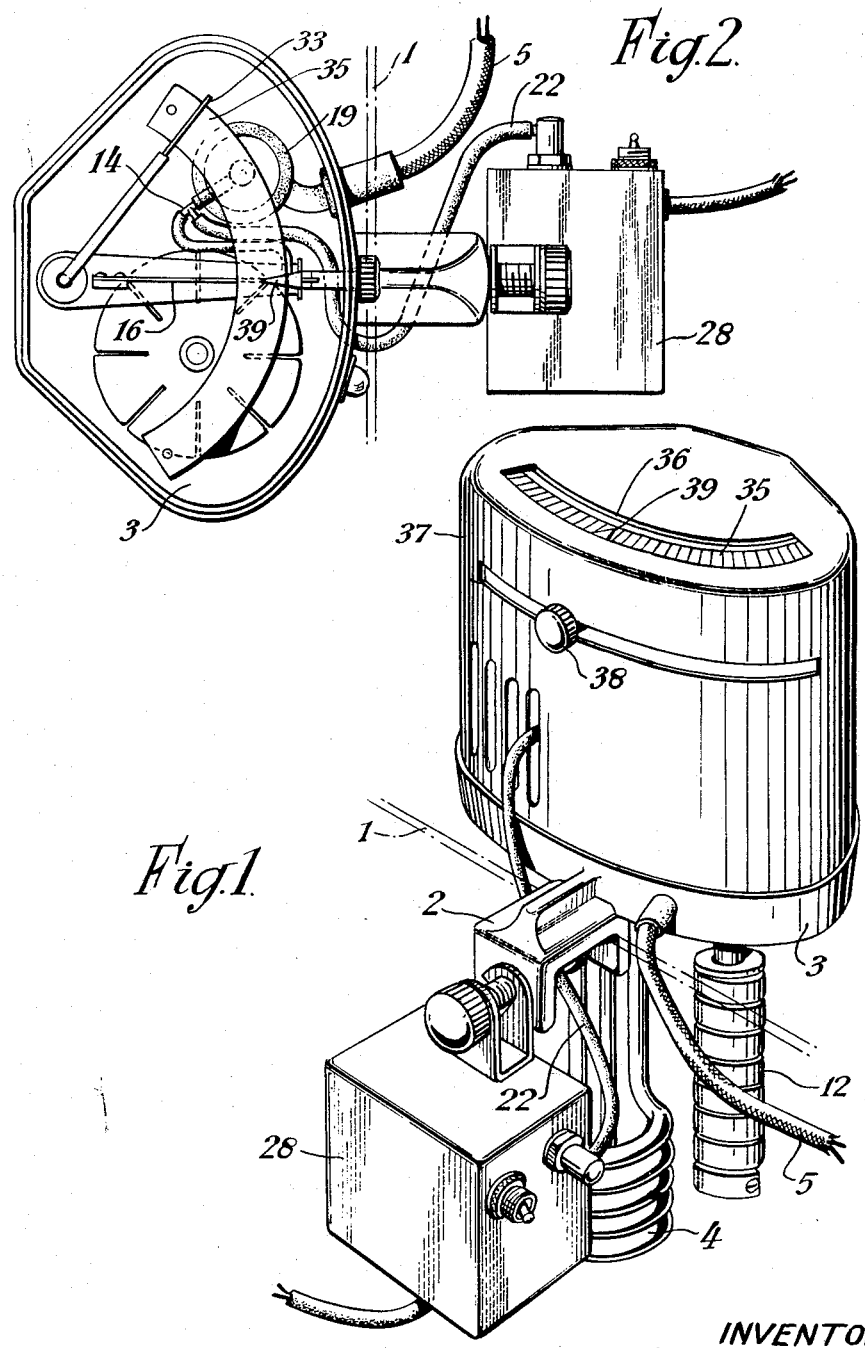
INVENTOR
NORMAN ADRIAN DE BRUYNE
BY
ATTORNEY

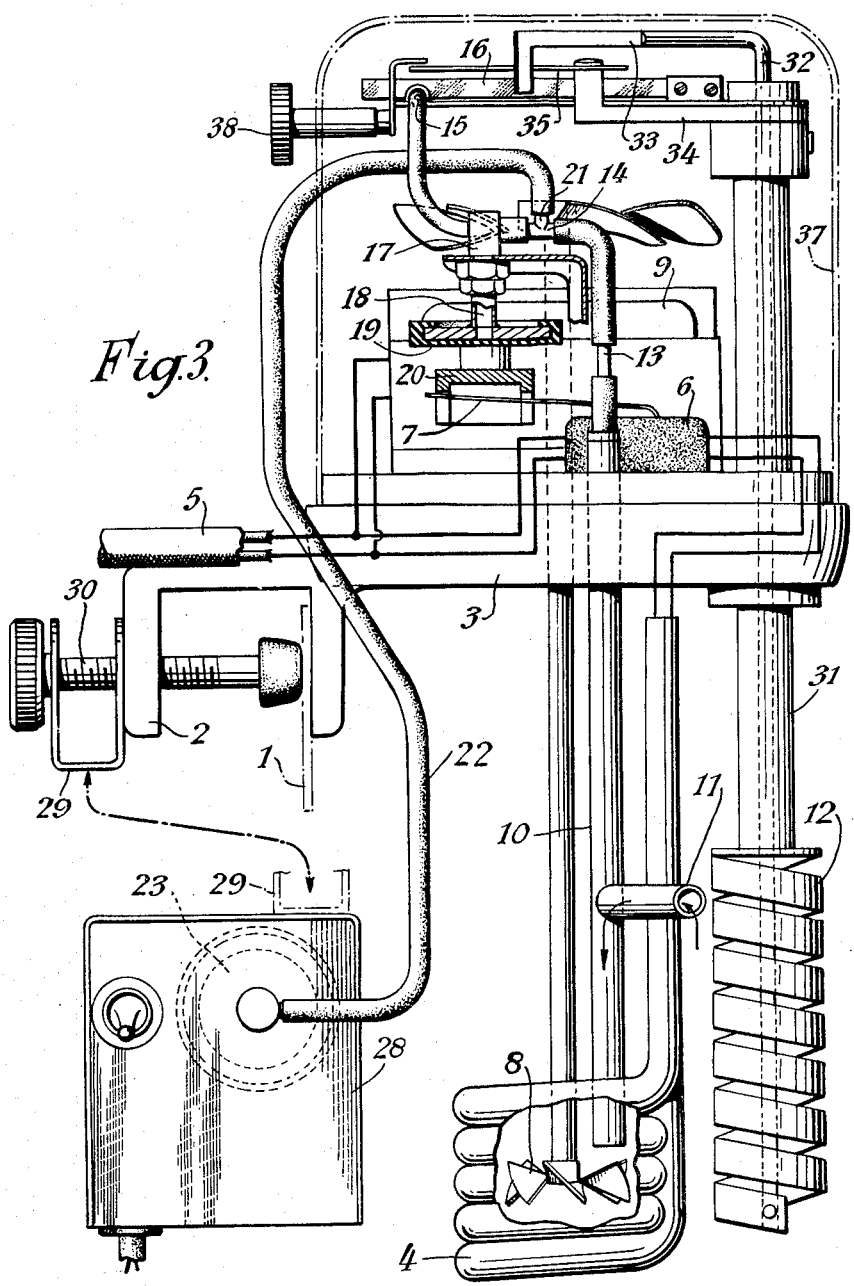

3,147,365
THERMOSTATICALLY CONTROLLED IMMERSION
HEATER ASSEMBLY
Norman Adrian de Bruyne, Duxford, Cambridge, England, assignor to Techne (Cambridge) Limited, Duxford, Cambridge, England
Filed Mar. 26, 1963, Ser. No. 268,109
Claims priority, application Great Britain Mar. 26, 1962
4 Claims. (Cl. 219—331)

This invention relates to thermostatic controllers for maintaining the temperature of a fluid for example a liquid in a bath or other container constant or substantially constant, the invention being particularly applicable for use with laboratory water baths where it is very desirable for the temperature of the fluid to be accurately controlled.

An example of a thermostatic controller to which the present invention is particularly applicable forms the subject of prior United States Patent No. 2,795,686.

The type of thermostatic controller to which the present invention is applicable includes a temperature transducer which may take the form of a helically wound bi-metallic element, a heater, a stirrer for the fluid, a jet and associated flapper or vane, the orifice of the jet being closed or opened by the vane which in turn is acted upon by the temperature transducer, thereby controlling the air pressure in a bellows or other air pressure responsive device actuating a switch in the heater circuit, to switch the heater on or off, such an arrangement enabling the temperature of a liquid to be controlled with quite close limits for example within ±0.05° C.

There are, however, circumstances such as for example in the measurement of viscosity where closer control of the temperature is required.

The chief object of the invention is to provide means for obtaining such closer temperature control.

The invention consists broadly in means for superimposing a pulsating pressure on the substantially uniform air pressure in the control circuit to render the flapper or vane more sensitive in operation.

Any suitable means may be employed for producing the pulsations such as for example a rubber or other flexible diaphragm which is deflected to and fro by a motor driven eccentric or similar operating member.

The invention will now be described in detail as applied to the known form of thermostatic controller disclosed by the specification and drawings of the above numbered patent. It must be clearly understood, however, that the invention is in no way limited to the construction shown in the accompanying drawings, the drawings merely depicting one form of controller to which the invention can be successfully applied.

Referring to the accompanying drawings:

FIGURE 1 is a perspective view of a thermostatic controller in accordance with the present invention;

FIGURE 2 is a plan view with the cover removed;

FIGURE 3 is a side elevation partly in section;

Figure 4:
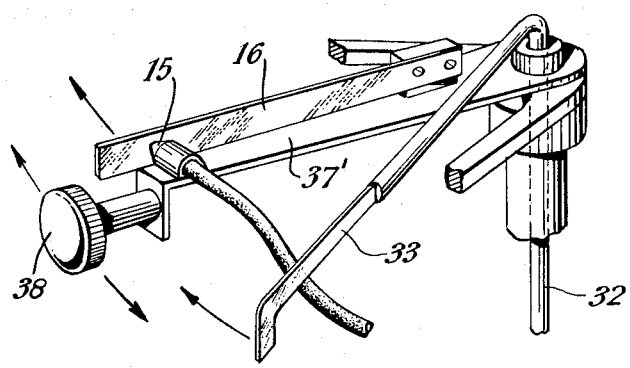
FIGURE 4 is a perspective view showing the elements of the suction control.

The thermostatic controller illustrated takes the form of a self-contained unit adapted to be mounted in position on the edge 1 of a water bath by means of the clamp 2. The instrument includes a platform 3 with which the clamp is associated, the platform carrying a depending immersion type electric heater 4 which is connected with the electric supply cable 5 via a micro-switch 6 having an operating lever 7.

Mounted within the coils of the electric heater is an impeller 8 driven by an electric motor 9 mounted on the platform, and a tube 10 having a branch tube 11, the open end of which lies in fairly close proximity to a bi-metallic helical thermostat 12 depending downwardly from the platform into the liquid in the bath.

The tube 10 contains a constriction 13 such as a length of capillary tubing, the tube 10 being thence extended upwardly to a T piece 14 and thence to a jet 15 which co-operates with a flapper or vane 16 which normally closes the jet orifice.

Interposed between the jet 15 and the T piece 14 is a branch 17 leading to a capsule 18 including a rubber or other flexible diaphragm 19 supporting at its centre a weighted switch operating member 20 which normally occupies the position shown when the jet orifice is closed by the vane 16 and the upper part of the tube 10 is under reduced pressure but when the jet orifice is uncovered to allow entry of air to the upper part of the tube 10, falls due to downward flexing of the diaphragm 19 to depress the lever 7 to open the contacts of the micro-switch 6 and thus break the electrical heater circuit.

The reduced pressure in the tube 10 is produced by the action of the impeller 8 which sets up a circulation of liquid into the open end of the branch 11 down the lower part of the tube 10 and out of its lower end thereby maintaining the temperature of the liquid substantially constant throughout the bath.

Figure 5:
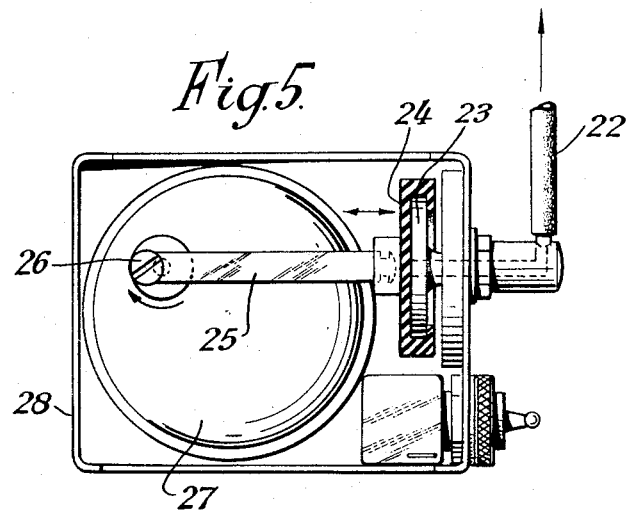
FIGURE 5 is a plan view partly in section of the pulsator mechanism.

The branch 21 of the T piece is connected via a flexible tube 22 to a capsule 23 (see FIGURE 5) including a rubber or other flexible diaphragm 24 which is deflected to and fro by a conncting rod 25 driven by an eccentric 26 rotated by an electric motor 27. The motor is geared so that the diaphragm 24 will oscillate to and fro at a frequency of approximately one complete oscillation a second. In this way a pulsating internal pressure will be set up in the upper part of the tube 10 leading to the jet orifice, which pressure will be sub-atmospheric. The magnitude of the oscillation of the diaphragm should be less than is sufficient to cause the contacts of the micro-switch to close when the jet orifice is open. By the use of a pulsating pressure, the amplitude of the temperature swing is considerably reduced.

The motor 27 is mounted in a casing 28 supported by a bracket 29 from the screw 30 of the clamp 2, the casing 28 being shown displaced in FIGURE 3 for ease of illustration.

The bi-metallic helix 12 is supported by a tube 31 attached to the platform 3, the tube containing an axially positioned rod 32 which carries a lever 33.

The tube 31 at its upper end supports a bracket 34 carrying a fixed scale 35 calibrated in degrees of temperature, the scale being observable through a window 36 in the top of the casing 37.

The jet 15 and the vane 16 are mounted on an arm 37' pivotable about the axis of the rod 32, the arm 37' carrying a knob 38 which when grasped by the fingers can be moved to rotate the arm into a position in which an associated pointer 39 lies opposite a particular desired temperature calibration.

Assuming that the electrical heater circuit has been switched on together with the electrical circuits of motors 9 and 27, the vane 16 will close the jet orifice, the liquid in the bath will circulate under the action of the impeller 8 and finally on the temperature of the liquid reaching the set reading on the calibrated scale the bi-metallic helix will tend to unwind thus rotating the rod 32 about the axis and moving the lever 33 into a position in which its extremity engages the extremity of the vane 16 and moves it into a position in which it no longer closes the jet orifice.

The pressure in the capsule 18 will then be raised causing the diaphragm 19 to be deflected downwardly and the member 20 to move the lever 7 to open the contacts of the micro-switch and thus break the electrical heater circuit.

As the temperature of the liquid drops the lever 33 will once more be moved clear of the vane 16 thus allowing the vane to once more close the orifice, the diaphragm to be moved upwardly and the contacts of the switch closed to again complete the heater circuit.

It will be appreciated that in the case of the controller described the air pressure in the tube leading to the jet is sub-atmospheric and consequently there will be a certain degree of suction applied to the vane 16 which will tend to pull the vane into a position in which it closes the jet orifice.

During the course of experiment it has been found that as a result of superimposing the oscillating air pressure on the substantially uniform controlling air pressure, the temperature swing which in the case of the apparatus forming the subject of my earlier patent was approximately ±0.05° C., i.e. total swing 0.1° C., is considerably reduced, i.e. to an amplitude of approximately 0.03° C.

I claim:
1. In a thermostatic controller of the type having an electric immersion heater, a thermostat for immersion in the liquid being heated for indirectly controlling the operation of the heater, tubular means extending downwardly into the liquid being heated adjacent to said heater and thermostat and having a side branch inlet also immersed in said liquid, an impeller means for circulating liquid and positioned to also create an aspirating effect in said tubular means, the upper portion of said tubular means comprising a first upper branch to control a micro-switch and a second upper branch comprising a jet which when open nullifies the aspirating effect in said first upper branch, moveable means adapted to close said jet in one position thereof and means connected to said thermostat adapted to operate said moveable means, the improvement comprising,
said tubular means comprising a third upper branch, flexible diaphragm means connected to said third upper branch,
means for imparting a to and fro movement to said flexible diaphragm to apply a pulsating pressure into said third upper branch and thence to said first and second upper branches,
and a restriction in said tubular means in a region between said liquid inlet branch and said upper branches.

2. A thermostatic controller of the kind referred to including an electric immersion heater, a thermostat intended for immersion in the liquid being heated and indirectly controlling the operation of said heater, a tube intended to depend downwardly into the liquid in the vicinity of the heater and thermostat and having a branch inlet also immersed in the liquid, an impeller for drawing in liquid through the branch inlet and down the tube for maintaining the liquid in circulation, an upward extension of the tube leading to a jet situated above the level of the liquid, a vane for co-operating with the jet orifice in an opening and closing sense, a branch passage from the upper part of said tube leading to a capsule means for actuating a micro-switch controlling the supply of electric current to the heater, a further branch passage from the upper part of said tube leading to a second capsule including a flexible diaphragm, means for imparting a to and fro deflecting movement to the diaphragm to apply a pulsating pressure to the jet, a restriction in said tube situated above the liquid inlet branch passage, means for setting the jets and vane in a predetermined angular position corresponding to a particular temperature at which it is desired to break the electrical circuit through the heater, and means associated with the thermostat for engaging the vane to control said jet orifice at the said pre-determined temperature, to vary the pressure in the micro-switch actuating capsule means to cause the latter to break the heater circuit.

3. A thermostatic controller as claimed in claim 2, wherein the pulsating pressure producing means comprises a diaphragm deflected by an eccentric driven by an electric motor.

4. A thermostatic controller as claimed in claim 2, wherein the vane normally closes the orifice in the jet, the pressure in the upper part of the tube and branch passages leading to the jet, pulsator and micro-switch operating capsule means being sub-atmospheric until such time as the vane is moved from its jet orifice closing position under the action of the thermostat.

References Cited in the file of this patent
UNITED STATES PATENTS
614,275    Porter _____ Nov. 15, 1898
2,795,686    De Bruyne _____ June 11, 1955